Dec. 22, 1942.   L. W. COLE ET AL   2,306,353
BUS DUCT
Filed Sept. 9, 1941   4 Sheets-Sheet 3
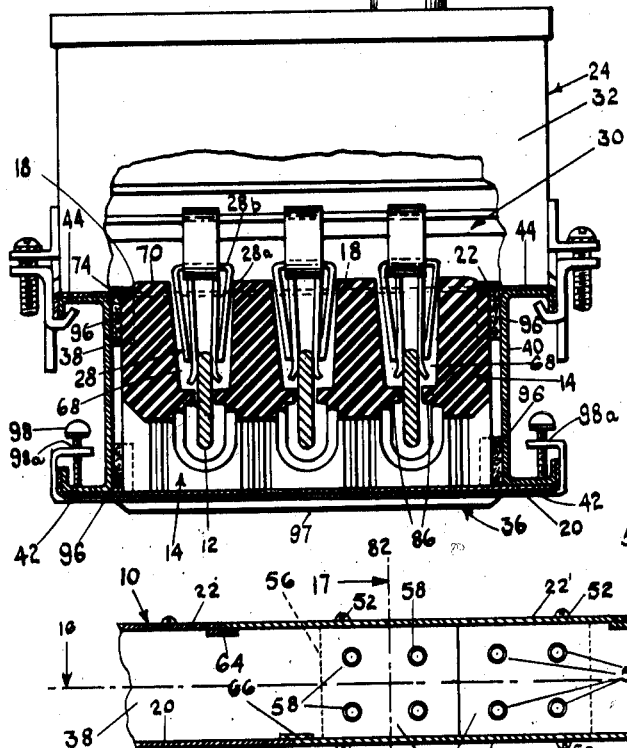
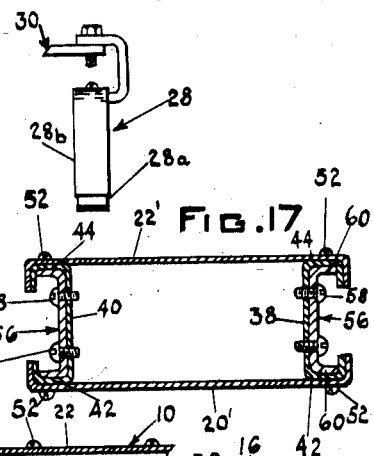
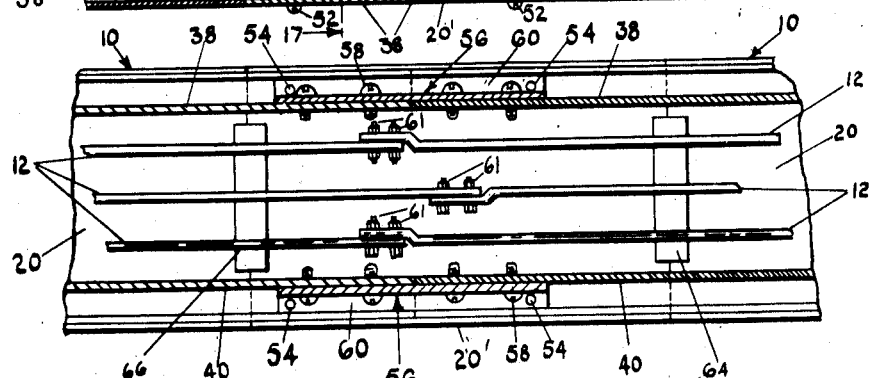
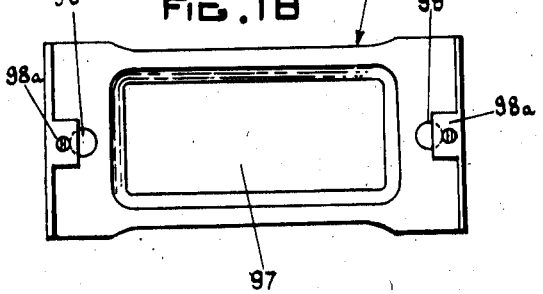
Inventor
LOUIS W. COLE
AND HELGE JENSEN
By Edwin Leusch
Attorney

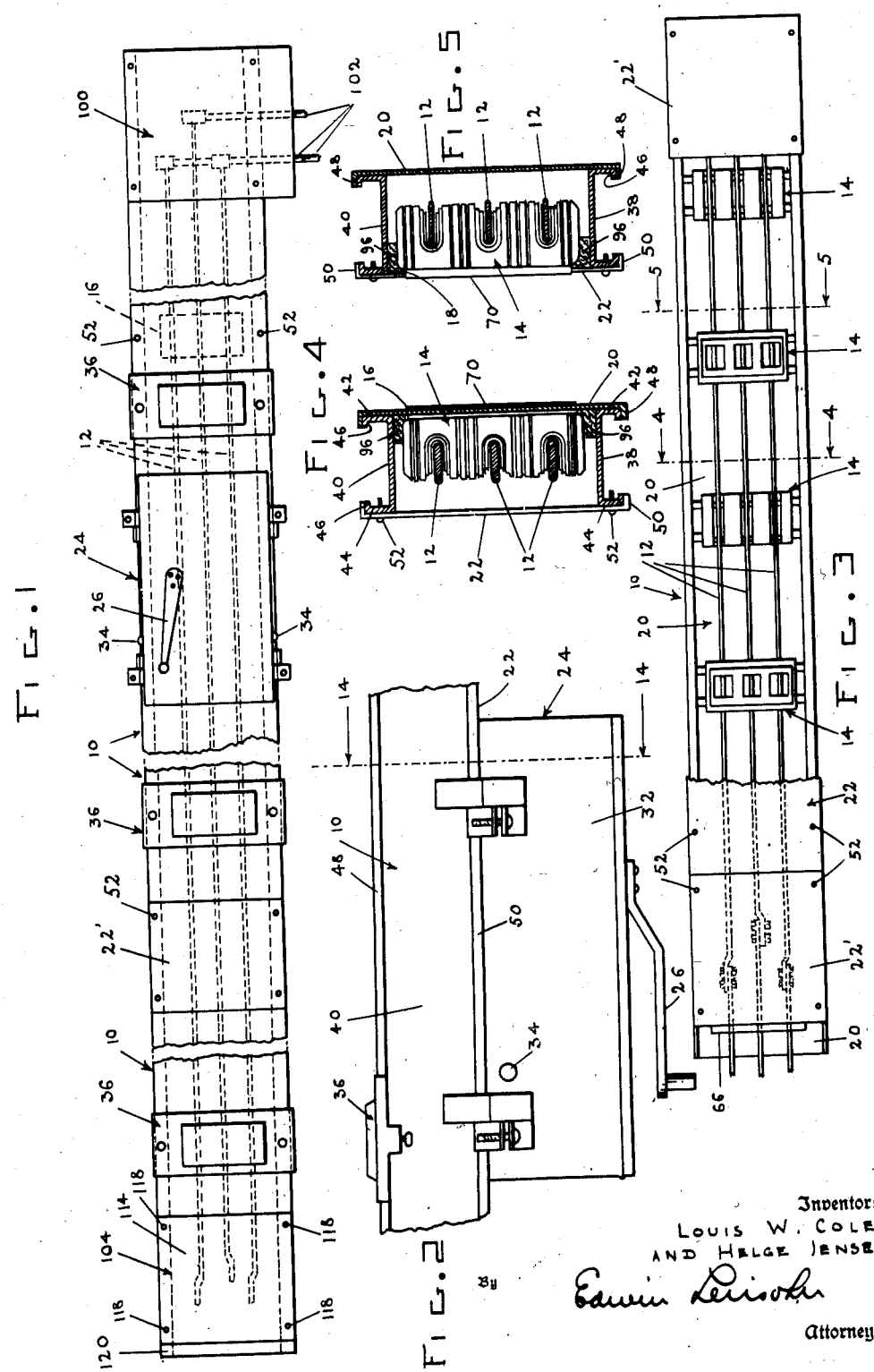

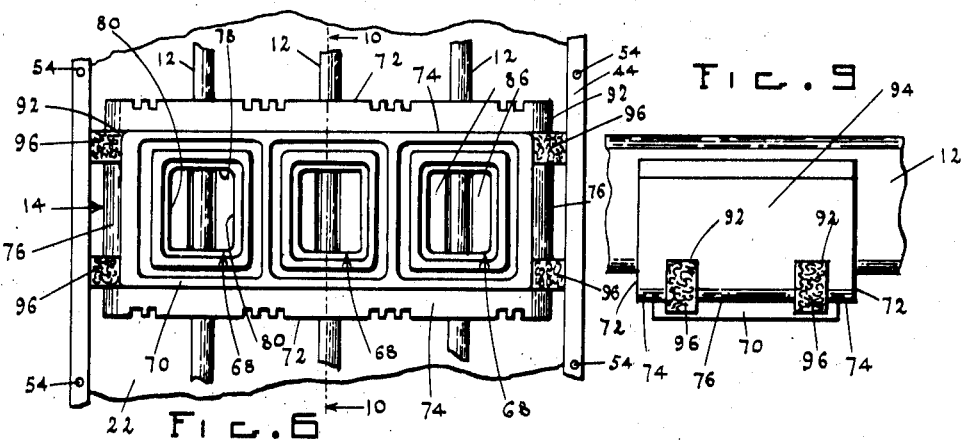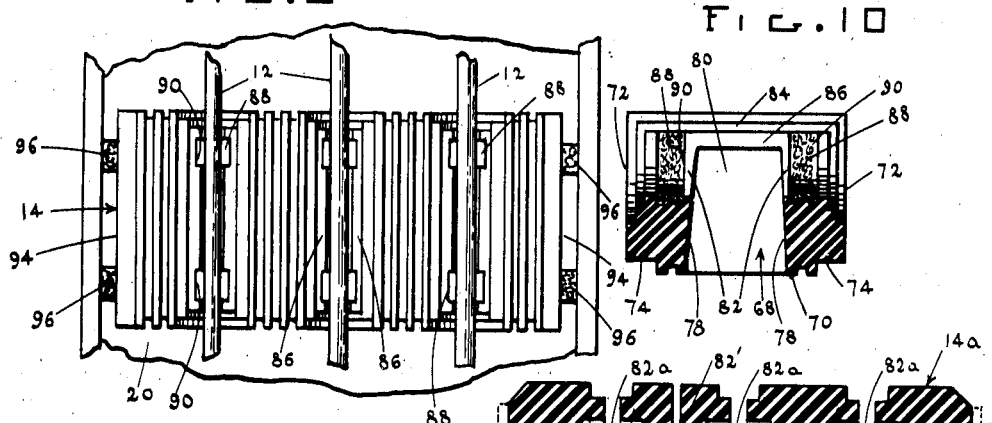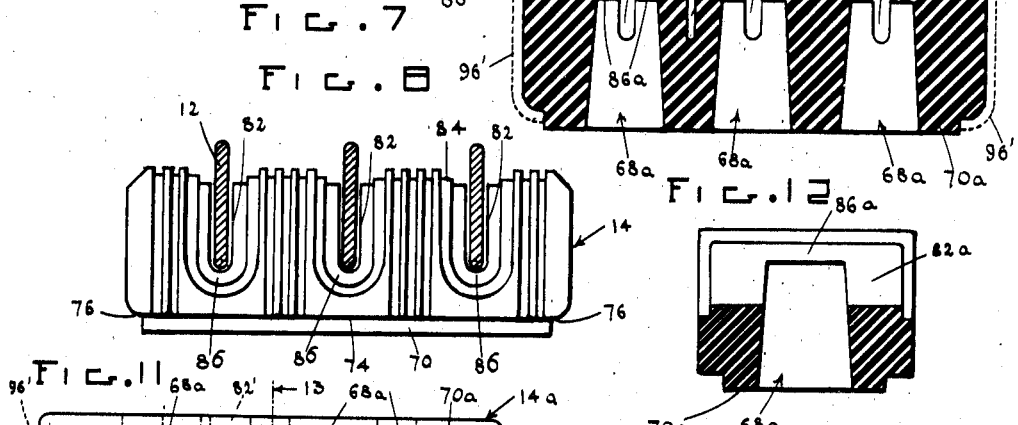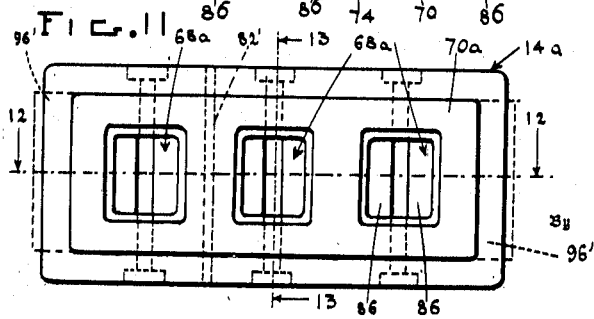

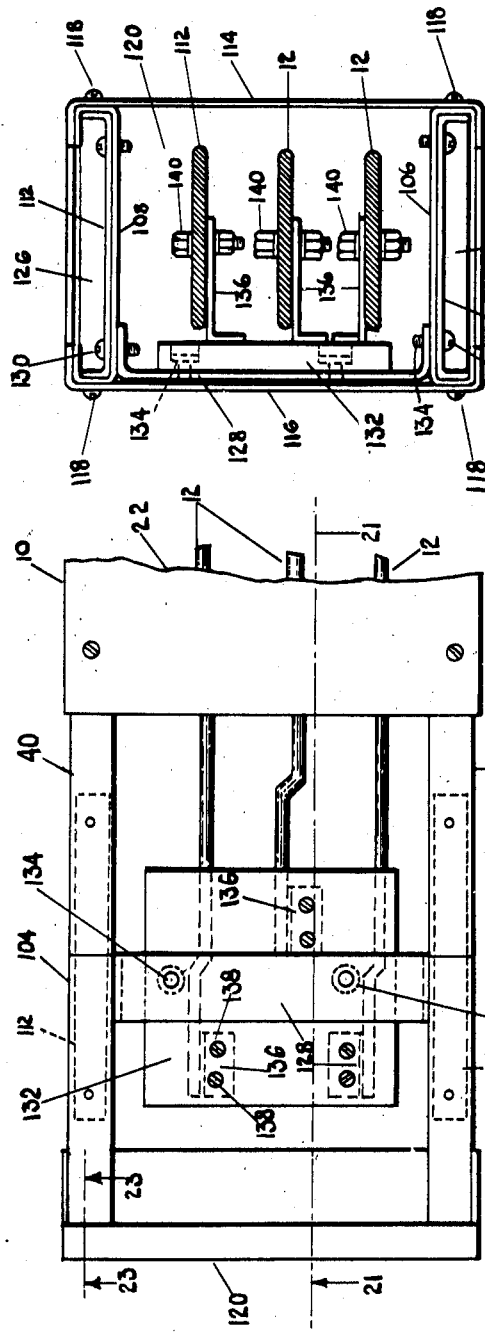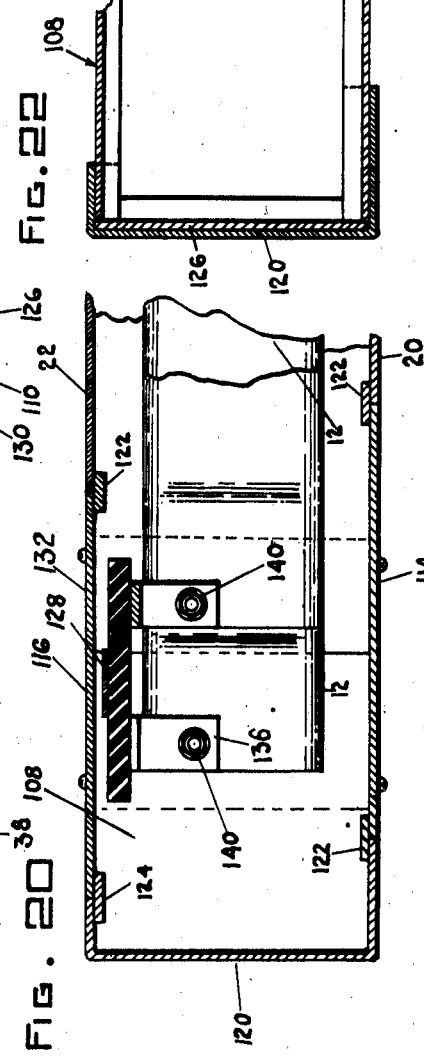

Patented Dec. 22, 1942

2,306,353

UNITED STATES PATENT OFFICE 2,306,353

BUS DUCT

Louis W. Cole, New York, and Helge Jensen, Flushing, N. Y., assignors to Cole Electric Products Co. Inc., Long Island City, N. Y., a corporation of New York Application September 9, 1941, Serial No. 410,143

12 Claims. (Cl. 173—334.1)

This invention relates to bus-ducts for electrical distribution system.

One object of the invention is the provision of a bus-duct provided with insulator members which not only support the buses in the longitudinally extending casing or duct but which are also constructed and arranged in such manner that they close communication between the interior and exterior of the duct through the duct openings in which the contacts of the branch-supply outlet devices are inserted for electrical connection with the buses, thus to prevent any foreign articles from finding their way into the interior of the duct where they might short-circuit the buses or do other damage.

Another object of the invention ancillary to the above mentioned object is the provision of insulator members which not only support the buses in the duct but also have recesses formed therein in which portions of the buses are exposed within the duct for engagement by the contacts of branch-supply outlet devices, said insulator members being further characterized in that they close the openings in the duct and prevent access to the buses except at the exposed portions thereof which are located in said recesses.

A further object of the invention is to provide a bus-duct in which the buses are held by means of insulator members disposed in said relation longitudinally of the duct and closely engaging the buses without however interfering with the circulation of air longitudinally of the duct.

Another object of the invention is to provide a duct formed of parts which can be readily shaped and easily assembled to form the duct structure.

Another object of the invention is to provide a bus-duct wherein the duct and the insulator members for supporting the buses therein are so constructed and arranged that the buses and the insulator members can be easily assembled in the duct without requiring threading of the buses through the insulator members, and the arrangement further being such that the insulator members and the buses are automatically secured in position by fastening a wall of the duct in position.

Another object of the invention is to provide a bus-duct formed of sections of predetermined lengths and readily connectible to each other to form a bus-duct of the desired length.

A yet further object of the invention is generally to provide a bus-duct of improved construction.

The above objects of the invention and other objects which might hereinafter appear will be fully understood from the following description, reference being had to the accompanying drawings, which illustrate the preferred embodiment of the invention.

In the drawings:

Fig. 1 is a view, in elevation, of a bus-duct embodying the present invention;

Fig. 2 is a view on a larger scale of part of the duct illustrated in Fig. 1 and showing also a branch-supply outlet switch;

Fig. 3 is a view of part of the bus-duct shown in Fig. 1, with a part of the wall of the duct removed, for the purpose of illustration;

Figs. 4 and 5 are sectional views on the lines 4—4 and 5—5, respectively, of Fig. 3;

Fig. 6 is a front view of an insulator member shown in position in the duct and showing also the buses associated with said insulator member;

Fig. 7 is a view similar to Fig. 6 showing the rear of the insulator member;

Fig. 8 is a side view of the insulating member;

Fig. 9 is an end view of the insulating member;

Fig. 10 is a sectional view of the insulating member on the line 10—10 of Fig. 6;

Fig. 11 is a front view of another form of insulating member;

Fig. 12 is a sectional view on the line 12—12 of Fig. 11;

Fig. 13 is a sectional view on the line 13—13 of Fig. 11;

Fig. 14 is a view partly in elevation and partly in section on the line 14—14 of Fig. 2;

Fig. 15 is a sectional view on the line 15—15 of Fig. 1 of a joint between adjacent sections of the duct;

Fig. 16 is a sectional view on the line 16—16 of Fig. 15 illustrating the joint between adjacent duct sections and between adjacent bus sections;

Fig. 17 is a sectional view of the duct on the line 17—17 of Fig. 15, the buses being omitted;

Fig. 18 is an enlarged inner face view of one of the covers for the branch-supply outlet opening;

Fig. 19 is a detail view in side elevation of one of the contact members of the switch illustrated in Fig. 14;

Fig. 20 is a side view in elevation of one end portion of the bus duct, a side wall section or plate being removed for the purpose of illustration;

Fig. 21 is a sectional view on the line 21—21 of Fig. 20;

Fig. 22 is an inner end view of the end section of the bus-duct, the buses being shown in section; and Fig. 23 is a detail sectional view on the line 23—23 of Fig. 20.

Referring now to the drawings in detail, the bus-duct embodying the present invention comprises an elongated duct or casing, which depending upon the length of the duct, is composed of one bus-duct section or, as here shown, of a plurality of bus-duct sections 10 readily connectable to and disconnectable from each other as will be hereinafter described. As here shown, a plurality of buses 12 in the form of flat bars are supported in the duct and are held in position therein, insulated from the duct and from each other by a plurality of insulating members 14. The duct is provided with a plurality of longitudinally spaced openings 16 and 18 provided in the opposite walls 20 and 22 of the duct and it will be observed that at each of said openings 16 and 18 there is positioned an insulating member 14.

In Figs. 1, 2 and 14 a branch-outlet switch 24 is shown mounted on the duct, the external switch operating handle being indicated at 26. Said switch has movable contacts 28 which comprise copper contact members 28a and spring steel members 28b which hold contact members 28a resiliently in contact with the buses. The movable contacts 28 of the switch are carried by a frame 30 pivotally mounted in the switch casing 32 on pivot pins 34, so that contact members 28 of said switch can be moved for engaging and disengaging the companion bus-bars 12. Switches of this type are well known and need no further description. It will be understood that switch 24 is mounted on the duct in position so that the contacts 28 can move through one of the openings 16 or 18, depending on which side of the duct said switch is positioned. Each of the duct openings 16 and 18 which are not in use for connecting a branch-supply outlet device is closed by a cover member 36 which will be subsequently described in further detail.

Referring now more particularly to the construction of the duct, besides the pair of opposed walls 20 and 22, said duct includes a pair of opposed walls 38 and 40 which like walls 20 and 22 extend longitudinally of the duct in parallel relation. Each of walls 38 and 40 has a pair of longitudinally extending outwardly directed flanges 42 and 44, and each of said flanges has a marginal bent portion 46 bent so that the edges of the flanges 42 and 44 of the companion wall confront each other. Walls 20 and 22 have bent portions 48 and 50, respectively, extending longitudinally thereof in engagement with the bent portions 46 of the adjacent flanges of walls 38 and 40. Either wall 20 or wall 22, here shown as wall 20, is permanently secured, as by spot welding, to the adjacent flanges of walls 38 and 40, while the other wall, here shown as wall 22, is removably fastened to the flanges of walls 38 and 40 in any suitable way as by screws 52 which pass through wall 22 and are threaded into openings 54 in adjacent flanges 44 of walls 38 and 40.

As indicated above, the complete duct or casing comprises a plurality of sections which vary in number depending upon the length of the duct. Provision is made for connecting the adjacent ends of adjacent duct sections in alignment with each other and for securing together the adjacent ends of the adjacent bus-bars located in said adjacent sections of the duct. Accordingly, as shown more particularly by Figs. 15 to 17, the adjacent end portions of adjacent duct sections 10 are secured to each other by coupling members 56 which are secured to adjacent walls 38 and 40, respectively, the adjacent ends of which are in abutting relation as shown in Figs. 15 and 16. Said coupling members 56 are secured to said walls 38 and 40 removably by means of screws 58. As shown in Figs. 16 and 17, said coupling members 56 are provided with outturned flanges 60 which engage the adjacent flanges 42 and 44 of said walls 38 and 40, respectively, and which are provided with threaded openings which are engaged by the screws 52 which fasten wall 22 in position. It will be noted that while the adjacent edges of walls 38 and 40 of adjacent sections of the duct abut each other, the other pair of opposed walls of adjacent sections of the duct are spaced from each other whereby to form an opening for providing access to the interior of the duct for connecting the adjacent ends of the bus-bars 12 to each other and for any other purpose requiring access to the interior of the duct at the joint between adjacent sections. As here shown, the adjacent ends of adjacent bus-bars are detachably connected to each other by bolts 61. The openings which provide access to the joints of the bus-bars are closed by removable plates 20' and 22' which are of the same construction as the walls 20 and 22, respectively, except in respect to the length thereof. Said plates 20' and 22' are secured to the flanges 60 of coupling members 56 removably by screws 52. Further, walls 20 and 22 are arranged so that the joints between said walls and plates 20' and 22' are in staggered relation longitudinally of the duct as illustrated in Fig. 15. Thus, as here shown, the end of wall 22 of the right hand section 10 of the duct extends beyond the end of wall 20 of said section of the duct, while in the case of the left hand section of the duct, the end of wall 20 extends beyond the end of the opposed wall 22 of that section of the duct. Straps 64 and 66 are provided for forming rabbetted joints between plates 20' and walls 20 and between plates 22' and walls 22 of adjacent sections of the duct. One set of straps, here shown as strap 64, are secured, as by spot welding, to the inner surface of walls 20 and 22 of one duct section at the joint end thereof while straps 66 are similarly secured to the inner surface of plates 20' and 22', said straps 64 and 66 overlapping the adjacent wall portions for closing the joints therebetween.

As indicated above, an important feature of the present invention resides in the construction and arrangement of the insulator members 14 which not only hold the bus-bars in proper relation in the duct but also are constructed to receive the contact members which are inserted through the duct openings 16 and 18, respectively, and which close communication between the exterior and the interior of the duct through said openings. Each of said insulator members 14 is formed of a block of any suitable insulation material and is preferably molded in the desired one-piece form. Referring now more particularly to Figs. 6 to 10 and 14 of the drawings, said insulator member 14 has formed therein a plurality of recesses 68 which are open at one side of the block which, for convenience in reference, may be referred to as the front of the block. Said recesses 68 terminate in the front raised portion 70 at the front of the block which is offset inwardly of the opposed sides 72 to provide shoulders 74 which lie close to the inner surface of walls 20 and 22, respectively, around the openings 16 and 18 therein, the raised portion 70 of the insulator blocks projecting slightly beyond the front surfaces of said walls 20 and 22, as shown in Fig. 14. It will be understood that raised portion 70 is somewhat smaller than the companion opening 16 or 18 at which the insulator member is positioned and that said opening is closed by the shoulders 74 and the end shoulders 76. Each recess 68 is defined by a pair of opposed walls 78 and by a pair of opposed walls 80, the walls of one pair being at right angles to the wall of the other pair. The walls of each pair converge slightly toward each other from the front of the block to the back thereof. Walls 78 have aligned slot-forming recesses 82 provided therein, said recesses being open at the inner side or back 84 of the block, and walls 80 have portions 86 projecting therefrom at the inner ends of said walls adjacent said side 84 of the block, said portions 86 being spaced from each other and in confronting relation. The space between companion wall portions 86 is in alignment with the recesses 82 and together with the latter constitute a slot into which a companion bus-bar is fitted, said slot being but slightly wider than the thickness of the bus-bar. Felt strips 88 are positioned in grooves 90 provided in recesses 82 as illustrated in Figs. 7 and 10, said felt strips being tightly compressed when the bus-bars are inserted in the slots in the insulator block.

It will be noted that the closed ends of the recesses 82 extend in wall portions 78 forwardly of wall portions 86 of recess 68 so that when the insulating member 14 is mounted on the bus-bars, portions of the latter are positioned in the companion recesses 68, respectively, as shown in Fig. 14, whereby said portions are exposed in said recesses 68 and position therein for engagement by the contact member 28 of the outlet device. Further it will be noted that wall portions 86 at the inner end of recess 68 lie close to or may even engage the opposite sides of the companion bus-bar whereby to close communication between the interior and the exterior of the duct through the opening 16 or 18 at which the particular insulation member is positioned.

By reference to Figs. 3 to 5 and 14 it will be observed that the insulator members 14 are disposed alternately adjacent the walls 20 and 22, respectively, in position at openings 16 and 18 in said walls and that the bus-bars are clamped between the closed ends of the recesses 82 of the oppositely disposed insulator members or blocks 14. When wall 22 is secured to walls 38 and 40, the insulator members 14 are clamped tightly between the adjacent wall 20 or 22 and the adjacent edges of the bus-bars, and at the same time said bus-bars are securely held in position. The insulator blocks have recesses 92 formed in the ends 94 of said insulator members, and felt blocks 96 are fitted in said recesses and project beyond the shoulders 74 and 76 for engagement, under compression, with the wall portion around the companion duct opening, and said felt blocks project beyond the adjacent ends 94 of the insulating members for engagement under compression with the adjacent walls 38 and 40, respectively, of the duct.

Another form of the insulator member is illustrated in Figs. 11 to 13. This insulator, indicated by the reference numeral 14a, is of substantially the same construction as the insulator 14 with the exception that it is provided with a slot 82', for the bus of a three phase four wire system, in addition to the slots 82a which correspond to the slots formed by the recess 82 and by the space between the wall portions 86 of the insulator members 14 hereinbefore described. It will be understood that the three buses which fit into slots 82a extending into recess 68a, respectively, for engagement by the contact members of the outlet supply device while the bus which is located in slot 82 is disposed between two of the recesses 68a and is not exposed at the front of the block. The raised portion 70a corresponds to the raised portion 70 of insulator member 14 and fits into a companion duct opening in the same way as raised portion 70 of insulator member 14. In lieu, however, of the belt blocks 96, felt strips 96' are provided in position to engage the marginal edge portion of wall 20 or 22 of the duct around the companion opening 16 or 18 as the case may be. The slots formed by recesses 82a and by wall portions 86a at the inner ends of recess 68a are not provided with felt strips, as in the case of recesses 82 and said recess 82a is accordingly not grooved, and it will be understood that recess 82a is designed to tightly engage the opposite sides of the companion bus-bar, this arrangement having been found desirable under certain conditions for preventing vibration or chattering of the bus-bars especially under usual or abnormal load conditions.

The manner of assembling the bus-bars 12 and the insulating members 14 in the bus-duct will be apparent from an inspection of Fig. 3. More particularly, it will be understood that before wall 22 is placed in position, the insulator members 14 are positioned at the openings in wall 20, the raised portions 70 at the front side of said insulator members being fitted in the companion openings 16 in said wall. Then the other set of insulator members 14 which are to lie adjacent wall 22 are fitted on the bus-bars 12 in positions corresponding to the positions of the companion openings 18 in wall 22. Finally wall 22 is placed in position and secured to the flanges 44 of walls 38 and 40 as explained above, it being understood that the raised portions 70 of the last mentioned insulator members are located in the companion openings 18 in wall 22. Thus, it will be observed that the insulator members 14 and the bus-bars 12 are automatically secured in position in proper assembly relation in the bus-duct when wall 22 is secured to walls 38 and 40 and that no separate fastening or positioning means for the buses and insulator members are necessary.

When the insulator members 14 are in position in the duct, raised portions 70 at the front of the insulator members project slightly beyond the outer surface of the adjacent walls 20 and 22 respectively. Therefore, the cover members 36 which are applied to the duct over the openings 16 and 18 therein which are not utilized for the insertion of contact members are each provided with a recessed or outwardly pressed portion 97 into which the outwardly projecting part 70 of the companion insulator member 14 is received. Cover members 36 are releasably fastened in position by wing screws 98 which are threaded through apertured ears 98a in said cover members and engage the adjacent flanges 42 or 44 of walls 38 and 40. Said cover member is provided with openings 99 which receive the heads of certain of the screws 52 which secure wall 22 to said flanges 44 of walls 38 and 40 of the duct. It will be noted that when a duct opening is to be used, it is merely necessary to loosen wing screws 98 sufficiently to loosen the covers so that they can be slid on the duct away from the companion duct opening, removal of the cover member being unnecessary.

As shown in Fig. 1, one end of the duct, here shown as the right hand (viewing Fig. 1) has connected thereto a housing 100 for the supply lines 102 which are electrically connected to the buses 12. Said housing 100 may be of any suitable construction and can be secured to the bus-duct in any suitable way, said housing closing the adjacent end of the duct. The other end of the duct, here shown as the left hand thereof (viewing Fig. 1) is provided with a duct closing end section 104 which is shown in further detail in Figs. 20 to 23. Said duct section 104 comprises a pair of flanged opposed walls 106 and 108 which correspond to the opposed walls 38 and 40 of the duct as described above. Walls 106 and 108 are connected to the end portions of walls 38 and 40 of the duct by coupling members 110 and 112 which are fixed to walls 106 and 108, respectively, and to the adjacent ends of walls 38 and 40, respectively, substantially in the same way as the coupling members 56 utilized, as described above, for connecting the adjacent ends of adjacent duct sections 10 to each other. The other pair of opposed walls of ends section 104 is constituted by flanged plates 114 and 116 which are fastened to the flanges of walls 106 and 108 removably by screws 118 which correspond to the screws 52 which fasten plates 20' and 22' at the joints between adjacent duct sections 10. The outer end of end section 104 is closed by a cap 120. Straps 122 provide rabbets between the adjacent ends of wall 20 and plate 116 and between the adjacent ends of wall 22 and plate 114. Similarly, straps 124 provide rabbets at the joints between end cap 120 and plates 114 and 166. The outer ends of flanged or channel walls 108 and 110 have integral flanges 126 to which end cap 102 is secured, as by spot welding, for closing said end section.

Provision is made for anchoring the ends of the bus-bars 12 of the adjacent duct section 10 in end section 104 of the duct. For this purpose a bracket 128 is fixed to walls 106 and 108 adjacent to wall 116 by screws 130, and a plate 132 of insulation material is secured to said bracket in any suitable way as by screws 134. Metal plates or brackets 136 are mounted on insulation plate 132 at right angles to the latter and are secured to said plate in any suitable way as by screws 138. The outer ends of buses 12 are secured to companion supporting plates or brackets 136 respectively by bolts 140. It will be understood that access to the interior of end section 104 for securing the outer ends of bus-bars to anchoring plates 136 is obtained by removing plate 114 from the end section, said plate being replaced after the bus-bars are fastened to their supporting plates 136. It will be understood that housing 100 through which the supply lines 102 are connected to the bus-bars at the adjacent duct section can be constructed substantially in the same way as the end section 104.

An important advantage of the above described duct construction, in addition to the other advantages thereof, is that various standard parts can be used for manufacturing ducts of various sizes, that is, for buses of various widths and therefore of various load capacities. More particularly, in accordance with the present invention the size of the duct is determined by the width of walls 38 and 40, the other parts of the duct as well as the insulator members 14 being the same for ducts of all sizes. In this connection it will be understood that the insulator members can be of the same size regardless of the capacity of the buses because the buses vary only in width and not in thickness, buses of all sizes fitting in the slots in said insulator members. It is seen, therefore, that the manufacture of ducts of the present invention for buses of various load capacities is greatly facilitated since, as stated, all parts except walls 38 and 40 can be of the same size regardless of load capacity, and further, since walls 38 and 40 for bus-ducts of various load capacities differ from each other only in the width thereof, an added feature of simplicity in the manufacture of the ducts is provided.

While we have shown and described the preferred embodiment of our invention it will be understood that the latter may be embodied otherwise than as herein disclosed and it will be understood further that in the illustrated embodiment certain changes in the details of construction and in the arrangement of parts may be made. Accordingly we do not wish to be limited to the construction herein specifically shown or described, except to the extent which may be required by the scope of the appended claims.

Having thus described our invention, what we claim and desire to secure by Letters Patent is:

1. A bus-duct comprising a longitudinally extending duct in which the buses extend and provided with longitudinally spaced openings through which contacts of branch-supply outlet devices can be inserted for electrical connection with the buses, and insulators for supporting the buses in said duct positioned in said duct at said openings, said insulators comprising blocks having recesses in alignment with said duct openings and exposing portions of the buses for engagement thereof by said contacts when the latter are inserted through a duct opening, said insulator blocks having shoulders abutting inner surface portions of the duct adjacent said duct openings, respectively, and portions positioned in said respective duct openings adjacent opposite longitudinally spaced edges of said duct openings for preventing movement of said blocks in either direction longitudinally of the duct.

2. A bus-duct comprising an elongated duct defined by pairs of opposed longitudinally extending walls, longitudinally extending bus-bars positioned in said duct in spaced relation to each other and to said walls, and insulating means for holding said bars in said relation comprising members disposed between said bars and one of the walls of one of said pairs of walls and members disposed between said bars and the opposed wall of said one pair of walls, said last mentioned opposed wall having longitudinally spaced openings therein and said last mentioned members comprising insulation blocks having recesses therein which register with said first openings, respectively, and which receive portions of said bars whereby to expose said bars for electrical connection with the latter of contacts of branch-supply outlet devices, said insulation blocks having shoulders abutting the inner surface of said last mentioned opposed wall adjacent said openings, respectively, therein and portions positioned in said openings adjacent opposite edges of the respective openings for preventing movement of said blocks in either of two opposite directions parallel to said last mentioned opposed wall.

3. A bus-duct comprising an elongated duct defined by pairs of opposed longitudinally extending walls, longitudinally extending bus-bars positioned in said duct in spaced relation to each other and to said walls, and insulating means for holding said bars in said relation comprising members disposed between said bars and one of the walls of one of said pairs of walls and members disposed between said bars and the opposed wall of said one pair of walls, each of said members comprising a block of insulation material having at one side thereof spaced narrow openings in which said bars are positioned in engagement with the block and having at the opposite side thereof spaced recesses which register with said openings, respectively, and into which said bars project, one of the walls of one of said pairs having longitudinally spaced openings which register with the recesses of said blocks, respectively, means carried by said blocks engageable with inner surface portions of the adjacent duct wall adjacent the companion duct openings, respectively, and means carried by said blocks engageable with longitudinally spaced opposed edges of the companion duct openings.

4. A bus-duct comprising an elongated duct defined by pairs of opposed longitudinally extending walls, longitudinally extending bus-bars positioned in said duct in spaced relation to each other and to said walls, and insulating means for holding said bars in said relation comprising insulation blocks disposed between said bars and one of the walls of one of said pairs of walls and insulation blocks disposed between said bars and the opposed wall of said one pair of walls, said last mentioned opposed wall having longitudinally spaced openings therein and said last mentioned blocks engaging said last mentioned wall in said openings, respectively, thereof and thereby held in position in said duct, each of said blocks having parts spaced inwardly from said opposite side thereof and overlapping the inner surface of the wall of the duct at the companion duct opening and parts positioned in the companion duct opening adjacent opposite longitudinally spaced edges thereof for preventing movement of the block longitudinally of the duct in either direction.

5. A bus-duct comprising an elongated duct defined by pairs of opposed longitudinally extending walls, longitudinally extending bus-bars positioned in said duct in spaced relation to each other and to said walls, and insulating means for holding said bars in said relation comprising members disposed between said bars and one of the walls of one of said pairs of walls and members disposed between said bars and the opposed wall of said one pair of walls, said last mentioned opposed wall having longitudinally spaced openings therein and said last mentioned members engaging said last mentioned wall in said openings, respectively, thereof and thereby held in position in said duct, said last mentioned members having recesses therein which register with said first openings, respectively, and which receive portions of said bars whereby to expose said bars for electrical connection with the latter of contacts of branch-supply outlet devices, means carried by said blocks engageable with inner surface portions of the adjacent duct wall adjacent the companion duct openings, respectively, and means carried by said blocks engageable with longitudinally spaced opposed edges of the companion duct openings.

6. A bus-block of the character described comprising a body of insulation material having a plurality of slots spaced from each other longitudinally of said body and a plurality of spaced main recesses spaced from each other longitudinally of said body and in communication with said slots, respectively, there being one of said recesses and a companion slot for each of a plurality of buses, each of said recesses being defined by pairs of opposed internal walls and by spaced wall portions which project from the opposed walls, respectively, of one of said pairs of walls and define a part of the companion slot, the opposed walls of the other pair of walls having recesses therein, respectively, in alignment with each other and with said part of the slot and forming the opposite end portions of said slot, said last mentioned recesses being open at one side of the block and closed at points located between said side and the opposite side of the block and said wall portions which define part of the slot being spaced from said points in the direction of said first mentioned side of the block, whereby when the block is associated with said buses the latter extend through said slots, respectively, and have parts disposed in the companion main recesses, respectively, said body having integral portions extending between adjacent walls of adjacent recesses and between adjacent walls of adjacent slots.

7. A bus-block of the character described adapted to be mounted in a bus-duct adjacent an opening therein, said bus-block comprising a body of insulation material having a recess therein open at one end thereof at one side of the block and a companion slot in communication with said recess and open at an opposite side of the block whereby when the block is associated with a bus-bar the latter extends through said slot and has a part disposed in said recess, said slot being defined by opposed spaced internal wall portions of the block which engage opposite sides of the associated bus-bar, said recess being large enough to receive, through said open end thereof, a contact member for electrical connection thereof with said part of the bus-bar which is disposed in said recess, said block having spaced shoulders thereon spaced rearwardly from and facing toward said first mentioned side of the block and spaced side edge portions projecting forwardly from said shoulders, respectively, in position to project forwardly into said opening adjacent spaced side edges, respectively, thereof.

8. A bus-block of the character described adapted to be mounted in a bus-duct adjacent an opening therein, said bus-block comprising a body of insulation material having a recess therein open at one end thereof at one side of the block and a companion slot in communication with said recess and open at an opposite side of the block whereby when the block is associated with a bus-bar the latter extends through said slot and has a part disposed in said recess, said slot being defined by opposed spaced internal wall portions of the block which engage opposite sides of the associated bus-bar, said recess being large enough to receive, through said open end thereof, a contact member for electrical connection thereof with said part of the bus-bar which is disposed in said recess, said first mentioned side of the block having shoulders formed thereon at opposite sides of said recess in position to lie in adjacent face to face relation with inner surface portions of the duct adjacent said opening therein, said block having spaced side edge portions projecting forwardly from said shoulders, respectively, in position to project into said opening adjacent spaced side edges, respectively, thereof.

9. A bus-block of the character described adapted to be mounted in a bus-duct adjacent an opening therein, said bus-block comprising a body of insulation material having a plurality of spaced slots and a plurality of spaced main recesses in communication with said slots, respectively, there being one of said recesses and a companion slot for each of a plurality of buses, each of said recesses being defined by pairs of opposed internal walls and by spaced wall portions which project from the opposed walls, respectively, of one of said pairs of walls and define a part of the companion slot, the opposed walls of the other pair of walls having recesses therein, respectively, in alignment with each other and with said part of the slot and forming the opposite end portions of said slot, said last mentioned recesses being open at one side of the block and closed at points located between said side and the opposite side of the block and said wall portions which define part of the slot being spaced from said points in the direction of said first mentioned side of the block, whereby when the block is associated with said buses the latter extend through said slots, respectively, and have parts disposed in the companion main recesses, respectively, said body having integral portions extending between adjacent walls of adjacent recesses and between adjacent walls of adjacent slots, said first mentioned side of the block having shoulders formed thereon at opposite sides of said recesses in position to lie in adjacent face to face relation with inner surface portions of the duct adjacent said opening therein, said block having spaced side edge portions projecting forwardly from said shoulders, respectively, in position to project into said opening adjacent spaced side edges, respectively, thereof.

10. An elongated duct for a longitudinally extending bus, comprising a pair of spaced opposed walls extending longitudinally of the duct in parallel relation, said walls having outturned flanges along their opposite side edges, respectively, said flanges of each wall each having a marginal edge portion bent so that the edges of the companion flanges of each wall are in confronting relation, and a pair of spaced opposed walls extending longitudinally of the duct in spaced parallel relation and secured to said flanges of said first mentioned walls, respectively, said last mentioned walls having bent marginal edge portions in overlapping engagement with the marginal edge portions of said flanges, respectively, at least one of said walls having a plurality of spaced openings provided therein for access to said bus.

11. An elongated duct for a longitudinally extending bus, comprising a pair of spaced opposed walls extending longitudinally of the duct in parallel relation, said walls having outturned flanges along their opposite side edges, respectively, and a pair of spaced opposed walls extending longitudinally of the duct in spaced parallel relation and secured to said flanges of said first mentioned walls, respectively, said last mentioned walls having bent marginal edge portions in overlapping engagement with the marginal edge portions of said flanges, respectively, all of said walls being formed in sections, and coupling members removably securing adjacent sections of said first mentioned walls to each other and provided with flanges removably secured to adjacent parts of the flanges of adjacent sections of said first mentioned walls.

12. An elongated duct for a longitudinally extending bus, comprising a pair of spaced opposed walls extending longitudinally of the duct in parallel relation, said walls having outturned flanges along their opposite side edges, respectively, a pair of spaced opposed walls extending longitudinally of the duct in spaced parallel relation and secured to said flanges of said first mentioned walls, respectively, all of said walls being formed in sections, coupling members removably securing adjacent sections of said first mentioned walls to each other, a longitudinally sectionalized bus in said duct, and means for securing adjacent bus sections to each other, one of the sections of one of said other pair of walls comprising a plate disposed between adjacent sections of said one of said other pair of walls and located in the region of the joint between adjacent bus sections and removable independently of the connection of said coupling members to said first mentioned walls, to permit access to the bus at said joint thereof while the other sections of the duct and said coupling members are in position.

LOUIS W. COLE.
HELGE JENSEN.